United States Patent [19]
Hecht et al.

[11] 3,891,355
[45] June 24, 1975

[54] COOLING ARRANGEMENT FOR A MOTOR DRIVEN COMPRESSOR

[75] Inventors: Gert Hecht, Brendlorenzen; Rudolf Schöning, Bad Neustadt, Saale; Wolfgang Pieper, Wurzburg, all of Germany

[73] Assignee: Siemens Aktiengesellschaft, Munich, Germany

[22] Filed: May 29, 1973

[21] Appl. No.: 364,276

[30] Foreign Application Priority Data
June 9, 1972 Germany............................ 2228326

[52] U.S. Cl................................. 417/371; 310/63
[51] Int. Cl............................................ F04b 39/06
[58] Field of Search ....... 417/366, 371, 368, 423 A, 417/424; 310/58, 62, 63

[56] References Cited
UNITED STATES PATENTS

| | | |
|---|---|---|
| 1,487,766 | 3/1924 | Sutcliffe................................ 310/58 |
| 1,808,845 | 6/1931 | Gifford et al........................ 310/58 |
| 2,531,342 | 11/1950 | Metz.................................. 417/366 |
| 2,573,850 | 11/1951 | Korte................................. 417/424 |
| 2,658,665 | 11/1953 | Tschudy............................. 417/366 |
| 3,106,334 | 10/1963 | Fogleman et al. .............. 417/366 X |
| 3,245,610 | 4/1966 | Sebok et al........................ 417/366 |

Primary Examiner—William L. Freeh
Assistant Examiner—Leonard Smith
Attorney, Agent, or Firm—Kenyon & Kenyon Reilly Carr & Chapin

[57] ABSTRACT

An improved cooling arrangement for the motor driving a side channel compressor in which one of the intake flow or outlet flow from the compressor is directed transversely through the motor housing to cool the one end of the motor thereby removing substantial heat from the motor while not seriously impeding the flow of the compressor medium.

5 Claims, 2 Drawing Figures

COOLING ARRANGEMENT FOR A MOTOR DRIVEN COMPRESSOR

BACKGROUND OF THE INVENTION

This invention relates to motor driven compressors in general and more particularly to an improved cooling arrangement for the motors of such compressors.

Electric motors driving compressors such as side channel compressors develop a considerable amount of heat which must be removed from the motor if an optimumly sized motor is to be used. That is, an uncooled motor driving the same compressor will have to be much larger than a cooled motor driving the same compressor, so as not to exceed temperature limits. One method of providing this cooling which has been previously used is that of causing the medium such as air which is being compressed to flow axially through the motor housing to remove the heat therefrom. Although this provides good cooling, it suffers from a serious disadvantage in that it materially restricts the flow of the medium and thereby causes a pressure loss within the compressor system. Thus it can be seen, that there is a need to provide an arrangement which will permit cooling of the driving motor in a compressor without materially affecting the pressure output of the compressor.

SUMMARY OF THE INVENTION

The present invention solves this problem by causing the medium being compressed to flow through one end of the motor. The flow is directed transversely through the motor housing so that it cools at least the coil ends on one end and the commutator of the motor if one is installed. This path provides adequate cooling without restricting the flow of the medium and is shorter than that of the previously used method of axial flow cooling. Thus, the pressure losses in the compressor are kept low. Two embodiments of the invention are illustrated. In the first embodiment, the cooling medium is directed transversely through one end of the motor prior to intake at the compressor. In the second embodiment, the compressor output is directed across the motor end. Although each embodiment shows a flow through one end of the motor casing, an arrangement wherein the flow is directed across both ends is also possible.

DETAILED DESCRIPTION OF THE PREFERRED EMBODIMENT

Figure 1:
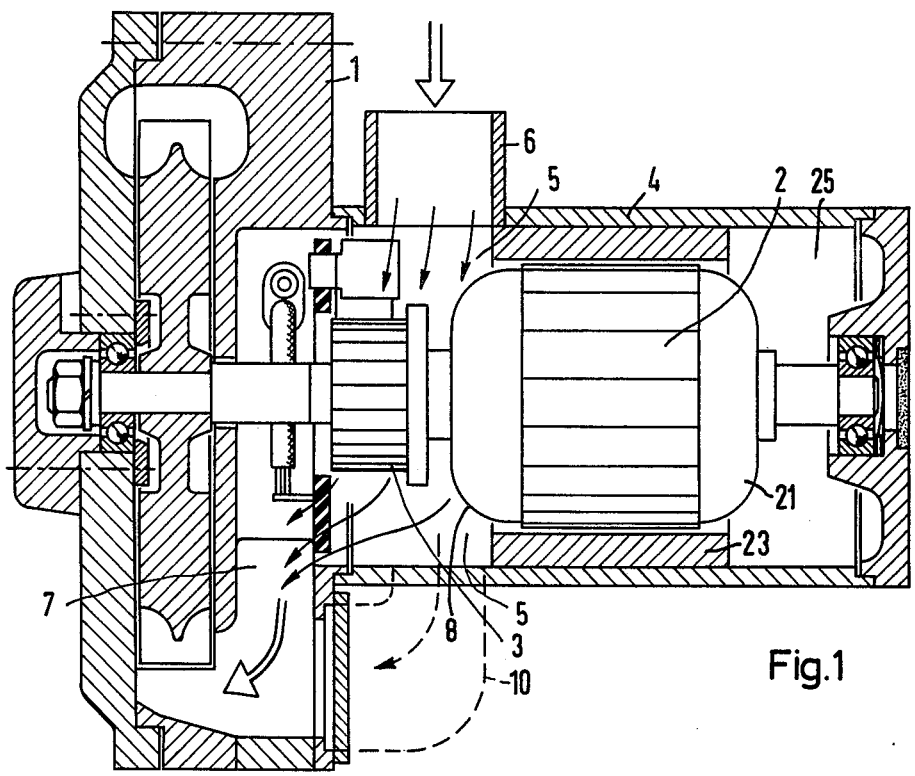
FIG. 1 is a cross sectional view of a motor driven compressor having the cooling arrangement of the present invention with the intake flow of the compressor being used for motor cooling.

FIG. 1 illustrates a first embodiment of the invention in which the compressor medium is directed through the motor housing prior to intake by the compressor. Shown thereon is a conventional side channel compressor 1 having an electric motor 2 mounted to the compressor housing to drive it. The illustrated motor has a commutator 3 on the side facing the compressor and attached to the shaft of armature 21 rotates in suitable bearing means to drive the compressor. Stator coils 23 are situated around the armature 21 and attached to motor casing 4. A radially extending inlet stub 6 is installed at the commutator end of the motor 2. The medium which is provided to the compressor inlet 7 will thus be directed through the stub 6, and over the commutator 3 and coil ends 8 of the armature 21 to provide cooling. The medium will also contact the coil ends of the stator 23. The air within the space 5 will thus effectively cool the commutator and the ends of the armature 21 and stator coils 23. An alternate embodiment for directing the medium is shown in dotted lines. In this embodiment a connecting line 10 is installed between the space 5 and the inlet 7 of the compressor. Such an arrangement can further enhance the flow since there will be less restriction thereof. In addition, an additional stub 6 may be provided at the other end of the motor housing along with an additional connecting line from the space 25 to the inlet 7 so that flow is directed through both ends of the motor casing. This both increases cooling and aids in reducing loss of pressure.

Figure 2:
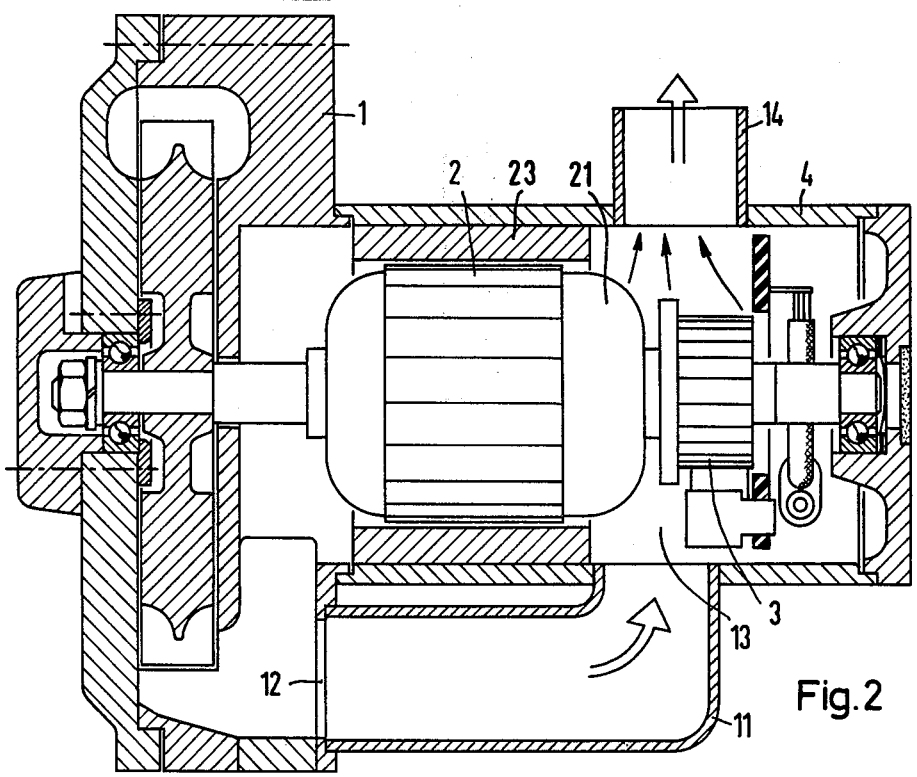
FIG. 2 is a similar cross sectional view illustrating an embodiment in which the output of the compressor is directed across the motor for cooling thereof.

In the embodiment of FIG. 2, the compressor discharge rather than the compressor intake is directed through the motor housing. In this embodiment similar parts are given the same reference numeral and will not be again described. As shown in FIG. 2, the compressor outlet 12 is coupled to the space 13 at the end of the motor by a connecting line 11. In this embodiment the commutator 3 faces away from the compressor 1 and is contained within the space 13. An outlet stub 14 is provided to direct the compressed medium to its ultimate destination. In the same manner as described above, the medium flows over the commutator 3, and the ends of the armature coils 21 and stator coils 23 thereby effectively cooling them. As indicated above, an additional connecting line may be installed at the other end of the motor 2 to provide cooling on both ends. As noted above, in addition to providing extra cooling such parallel paths will further cut down on flow restrictions and thereby cause pressure losses to be further reduced. Although the motor 2 illustrated herein is a commutator motor, the arrangement of the present invention can equally well be used to cool other types of motors.

Thus, an improved cooling arrangement for the motor of a motor driven compressor has been shown. Although specific embodiments have been illustrated and described it will be obvious to those skilled in the art that various modifications may be made without departing from the spirit of the invention which is intended to be limited solely by the appended claims.

What is claimed is:

1. In a side channel compressor including a compressor housing having a compressor medium inlet disposed therein, and driven by an electric motor disposed in a motor casing mounted on said compressor housing, said motor including an armature disposed within said casing, and said compressor housing inlet opening into the interior space of said casing on one side of, and adjacent one end of, said motor armature, the improvement comprising a compressor medium inlet pipe stub, coupled to and opening into said interior space of said casing, and extending radially outwardly therefrom with respect to said armature, said inlet stub being disposed adjacent said one end of said armature on the side opposite said one side thereof, for directing the compressor medium transversely through said motor casing across said one end of said armature and into said compressor medium inlet, for cooling said motor.

2. The compressor recited in claim 1, wherein said motor includes a commutator disposed adjacent said one end of said armature between said inlet stub and said compressor medium inlet.

3. The compressor recited in claim 1, further comprising a connecting line coupled to said compressor medium inlet and to said motor casing on said other side of said armature opposite said inlet stub, for directing said compressor medium from said motor casing to said compressor medium inlet.

4. In a side channel compressor including a compressor housing having a compressor medium discharge outlet disposed therein, and driven by an electric motor disposed in a motor casing mounted on said compressor housing, said motor including an armature disposed within said casing, the improvement comprising a compressor medium outlet pipe stub, coupled to and opening into the interior space of said motor casing, and extending radially outwardly therefrom with respect to said armature, said outlet stub being disposed adjacent one end of, and on one side of, said armature, and further comprising a connecting line, coupled to said compressor medium outlet and to said casing and disposed opposite said outlet stub adjacent said one end of said armature and on the side opposite said one side thereof, for directing said compressor medium from said discharge outlet, through said connecting line, and transversely through said casing to said outlet stub, for cooling said motor.

5. The compressor recited in claim 4, wherein said motor includes a commutator disposed adjacent said one end of said armature between said outlet stub and said connecting line.

* * * * *